(12) United States Patent
Kojima

(10) Patent No.: US 8,524,393 B2
(45) Date of Patent: Sep. 3, 2013

(54) METHOD FOR PRODUCING ELECTRODE LAMINATE AND ELECTRODE LAMINATE

(75) Inventor: Shinji Kojima, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/056,268

(22) PCT Filed: Nov. 25, 2009

(86) PCT No.: PCT/JP2009/069827
§ 371 (c)(1),
(2), (4) Date: Jan. 27, 2011

(87) PCT Pub. No.: WO2011/064842
PCT Pub. Date: Jun. 3, 2011

(65) Prior Publication Data
US 2012/0225351 A1 Sep. 6, 2012

(51) Int. Cl.
*H01M 4/08* (2006.01)
(52) U.S. Cl.
USPC .......................................... 429/209
(58) Field of Classification Search
None
See application file for complete search history.

(56) References Cited

U.S. PATENT DOCUMENTS

2009/0142669 A1   6/2009   Shinohara et al.

2011/0300451 A1* 12/2011 Inda .............................. 429/319

FOREIGN PATENT DOCUMENTS

| CN | 101494299 | 7/2009 |
|---|---|---|
| JP | A-2008-103145 | 5/2008 |
| JP | A-2008-103244 | 5/2008 |
| JP | A-2008-103282 | 5/2008 |
| JP | A-2008-234843 | 10/2008 |
| JP | A-2009-9905 | 1/2009 |
| JP | A-2009-146657 | 7/2009 |
| JP | A-2009-176484 | 8/2009 |
| JP | A-2009-176541 | 8/2009 |
| JP | A-2009-238636 | 10/2009 |

OTHER PUBLICATIONS

International Search Report issued in International Application No. PCT/JP2009/069827 on Feb. 16, 2010 (with translation).

* cited by examiner

*Primary Examiner* — Patrick Ryan
*Assistant Examiner* — Wyatt McConnell
(74) *Attorney, Agent, or Firm* — Oliff & Berridge, PLC

(57) ABSTRACT

A method for producing an electrode laminate including a current collector using aluminum as the material and an electrode layer laminated on the current collector, where the method includes the steps of: laminating an electrode layer forming composition, which contains at least a sulfide-based solid electrolyte and an active material and no binding agent, on the current collector; and f heating the current collector and the electrode layer forming composition at a temperature of not less than 60° C. and adhering them.

21 Claims, 4 Drawing Sheets
(1 of 4 Drawing Sheet(s) Filed in Color)

METHOD FOR PRODUCING ELECTRODE LAMINATE AND ELECTRODE LAMINATE

TECHNICAL FIELD

The present invention relates to a method for producing an electrode laminate, which is useful as an electrode of an all-solid lithium secondary battery, for example, and an electrode laminate.

BACKGROUND ART

In various batteries, a lithium secondary battery has such advantages as light weight, high output, and high energy density and is in heavy usage as a power source for devices, such as the small portable electronic equipment and the portable information terminals to support the current information-driven society. Further, the lithium secondary battery has attracted attention as a power source of electric vehicles and hybrid vehicles and is required to realize a higher energy density, improve the safety, and increase in size.

Since a currently commercially available lithium secondary battery uses an organic liquid electrolyte using a combustible organic solvent as a solvent, a safety device preventing temperature increase in short circuit is required to be mounted, or structures and materials for short circuit prevention are required to be improved. On the other hand, the all-solid lithium secondary battery which uses a solid electrolyte instead of the liquid electrolyte and is fully solidified does not use the combustible organic solvent in the battery. Therefore, the safety device can be simplified, and it is considered that the all-solid lithium secondary battery is excellent in production cost and productivity. As an example of the solid electrolyte, there has been known a sulfide-based solid electrolyte.

An electrode body used in an all-solid secondary battery generally comprises a current collector formed of a metal foil and an electrode layer (cathode layer or anode layer) formed on the current collector and containing an active material (cathode active material or anode active material). The electrode layer may contain other materials such as a solid electrolyte and a conductive auxiliary agent in addition to the active material. As a method for producing an electrode body, there has been known, for example, a method using slurry, which contains an electrode material and a solvent. For example, Patent Document 1 discloses a method for producing an electrode body, in which slurry containing an active material, a sulfide-based solid electrolyte, and a solvent is subjected to film-formation, dried, and the resultant is subjected to pressure molded thereafter. Patent Document 2 discloses a method for producing an electrode body, in which slurry containing an active material, a sulfide-based solid electrolyte, a binding agent, and a solvent is applied to a current collector and the resultant is heated and dried under reduced pressure. Patent Documents 3 to 5 disclose a method for producing an electrode body, in which a powder electrode material containing no solvent is used.

PRIOR ART DOCUMENTS

Patent Documents

Patent Document 1: Japanese Patent Laid-Open Publication No. 2009-176541
Patent Document 2: Japanese Patent Laid-Open Publication No. 2009-176484
Patent Document 3: Japanese Patent Laid-Open Publication No. 2008-103244
Patent Document 4: Japanese Patent Laid-Open Publication No. 2008-234843
Patent Document 5: Japanese Patent Laid-Open Publication No. 2008-103145

SUMMARY OF THE INVENTION

Problems to be Solved by the Invention

As described in the Patent Document 1, when the active material and the sulfide-based solid electrolyte are subjected to pressure molding, a percentage of voids is reduced, so that an electrode body with improved ion conductivity can be obtained. However, in this method, an adhesiveness between the current collector and the electrode layer is not sufficient, and there is a problem that the durability of the electrode body is low. The electrode body containing the binding agent as described in the Patent Document 2 has a problem that the capacity density of the battery is reduced, and the internal resistance is increased. Since the sulfide-based solid electrolyte has a high reactivity, there is a problem that it is difficult to select a solvent and a biding agent.

In view of the above problems, a main object of the present invention is to provide a method for producing an electrode laminate, which can provide an electrode laminate having a high adhesiveness between a current collector and an electrode layer by a simple and easy method without reducing the capacity density of a battery and increasing the internal resistance.

To solve above described problems, there is provided in the present invention a method for producing an electrode laminate, which comprises a current collector using aluminum as a material and an electrode layer laminated on the current collector, the method comprising the steps of: laminating an electrode layer forming composition, which contains at least a sulfide-based solid electrolyte and an active material and no binding agent, on the current collector; and a heating step of heating the current collector and the electrode layer forming composition at a temperature of not less than 60° C. and adhering them.

According to the present invention, a current collector using aluminum as the material and an electrode layer forming composition containing at least a sulfide-based solid electrolyte and an active material and no binding agent are adhered by heating at a temperature of not less than 60° C., whereby aluminum atoms derived from the current collector are diffused in a sulfide-based solid electrolyte in an electrode layer. Therefore, an electrode laminate having a high adhesiveness between the current collector and the electrode layer can be simply and easily obtained. By virtue of not containing the biding agent, the reduction in the capacity density of the battery and the increase of the internal resistance can be suppressed.

In the present invention, the electrode layer forming composition preferably contains only the sulfide-based solid electrolyte, the active material, a conductive auxiliary agent, and a solvent.

There is provided in the present invention a method for producing an electrode laminate, which comprises a current collector using a metal as a material and an electrode layer laminated on the current collector, the method comprising the steps of: laminating an electrode layer forming composition, which contains at least a sulfide-based solid electrolyte and an active material and no binding agent and no solvent, on the current collector; and a heating step of heating the current collector and the electrode layer forming composition.

According to the present invention, by virtue of not containing the solvent, composition distribution of the electrode layer forming composition does not occur at an interface between the current collector and the electrode layer, and the sulfide-based solid electrolyte is not unevenly distributed. Therefore, the adhesiveness between the current collector and the electrode layer can be increased. Further, the current collector and the electrode layer forming composition are heated, whereby the electrode laminate having a high adhesiveness between the current collector and the electrode layer can be simply and easily obtained. Furthermore, by virtue of not containing the biding agent, the reduction in the capacity density of the battery and the increase of the internal resistance can be suppressed.

In the present invention, the heating step is preferably a step of heating the current collector and the electrode layer forming composition at a temperature of not less than 120° C. and adhering them. This is because metal atoms derived from the current collector are diffused in the sulfide-based solid electrolyte in the electrode layer, and an electrode laminate having a higher adhesiveness between the current collector and the electrode layer can be obtained.

In the present invention, the electrode layer forming composition preferably contains only the sulfide-based solid electrolyte, the active material, and a conductive auxiliary agent.

In the present invention, the heating temperature in the heating step is preferably not less than 150° C. This is because metal atoms derived from the current collector are easily diffused in the sulfide-based solid electrolyte in the electrode layer, and an electrode laminate having a higher adhesiveness between the current collector and the electrode layer can be obtained.

In the present invention, the method preferably further comprises a pressurizing step of pressure-molding the current collector and the electrode layer and integrating them. This is because a contact area between the current collector and the sulfide-based solid electrolyte is increased, and an electrode laminate having a higher adhesiveness between the current collector and the electrode layer can be obtained.

In the present invention, the pressurizing step preferably comprises, before the heating step, a normal temperature-pressing step of pressing at normal temperature a metal foil of the current collector and the electrode layer forming composition which are previously at normal temperature. This is because an unsoftened electrode layer forming composition is sunk into the metal foil, whereby the contact area between the current collector and the sulfide-based solid electrolyte is increased, and an electrode laminate having a higher adhesiveness between the current collector and the electrode layer can be obtained.

In the present invention, the sulfide-based solid electrolyte is preferably a $Li_2S$—$P_2S_5$ compound. This is because the $Li_2S$—$P_2S_5$ compound has a superior lithium ion conductivity.

In the present invention, the active material is preferably lithium cobalt oxide ($LiCoO_2$). This is because lithium cobalt oxide has favorable properties as an active material for cathode and is used widely.

According to the present invention, there is provided an electrode laminate, which comprises a current collector using aluminum as a material and an electrode layer, formed by laminating an electrode layer forming composition, which contains at least a sulfide-based solid electrolyte and an active material and no binding agent, on the current collector, wherein aluminum atoms derived from the current collector are diffused in the sulfide-based solid electrolyte in the electrode layer.

According to the present invention, the electrode laminate having a high adhesiveness between the current collector and the electrode layer can be provided.

According to the present invention, the sulfide-based solid electrolyte is preferably a $Li_2S$—$P_2S_5$ compound. This is because the $Li_2S$—$P_2S_5$ compound has a superior lithium ion conductivity.

According to the present invention, the active material is preferably lithium cobalt oxide ($LiCoO_2$). This is because lithium cobalt oxide has favorable properties as an active material for cathode and is used widely.

According to the present invention, a concentration of the aluminum atoms derived from the current collector is preferably not less than 10 atom % in a region from an adhesion interface between the current collector and the electrode layer to at least 250 nm in the depth direction in the electrode layer. This is because, as described above, the aluminum atoms are diffused in the sulfide-based solid electrolyte in the electrode layer, whereby the electrode laminate having a high adhesiveness between the current collector and the electrode layer can be provided.

In the present invention, a method for producing an all-solid secondary battery comprising a battery element-forming step of forming a battery element using the electrode laminate obtained by the above-mentioned embodiment of the method for producing an electrode laminate and a solid electrolyte layer is provided.

According to the present invention, by virtue of the use of the electrode laminate obtained by the method for producing an electrode laminate explained above, the adhesiveness between the current collector and the electrode layer can be increased, and an all-solid secondary battery which is highly durable in use can be obtained.

In the present invention, an all-solid secondary battery using the above-mentioned electrode laminate is provided.

According to the present invention, by virtue of the use of the electrode laminate having a high adhesiveness between the current collector and the electrode layer, the all-solid secondary battery which is highly durable in use can be provided.

Effect of the Invention

The present invention provides such an effect that an electrode laminate having a high adhesiveness between a current collector and an electrode layer can be obtained by a simple and easy method without reducing the capacity density of a battery and increasing the internal resistance.

BRIEF DESCRIPTION OF THE DRAWINGS

This application contains at least one drawing executed in color.

BEST MODE FOR CARRYING OUT THE INVENTION

Hereinafter, a method for producing an electrode laminate, an electrode laminate, a method for producing an all-solid secondary battery, and an all-solid secondary battery of the present invention will be described in detail.

A. Method for Producing Electrode Laminate

First, a method for producing an electrode laminate will be described. The method for producing an electrode laminate according to the present invention can be divided into two embodiments (first and second embodiments). The first embodiment comprises steps of laminating an electrode layer forming composition, which contains at least a sulfide-based solid electrolyte and an active material and no binding agent, on a current collector using aluminum as a material; and heating the current collector and the electrode layer forming composition at a temperature of not less than 60° C. and adhering them. The second embodiment comprises steps of laminating an electrode layer forming composition, which contains at least a sulfide-based solid electrolyte and an active material and no binding agent and no solvent, on a current collector; and heating the current collector and the electrode layer forming composition. The method for producing an electrode laminate according to the present invention can be applied in both an electrode laminate of a cathode layer and an electrode laminate of an anode layer.

Hereinafter, the method for producing an electrode laminate according to the present invention will be described for each embodiment.

1. First Embodiment

First, the method for producing an electrode laminate according to the first embodiment of the present invention will be described. The method for producing an electrode laminate according to the first embodiment comprises of the steps of: laminating an electrode layer forming composition, which contains at least a sulfide-based solid electrolyte and an active material and no binding agent, on a current collector using aluminum as a material; and heating the current collector and the electrode layer forming composition at a temperature of not less than 60° C. and adhering them.

According to the present embodiment, the current collector using aluminum as the material and the electrode layer forming composition, which contains at least the sulfide-based solid electrolyte and the active material and no binding agent, are adhered by heating at the temperature of not less than 60° C., whereby aluminum atoms derived from the current collector are diffused in the sulfide-based solid electrolyte in an electrode layer. Therefore, an electrode laminate having a high adhesiveness between the current collector and the electrode layer can be simply and easily obtained. By virtue of not containing the biding agent, the reduction in the capacity density of the battery and the increase of the internal resistance can be suppressed.

Figure 1A:
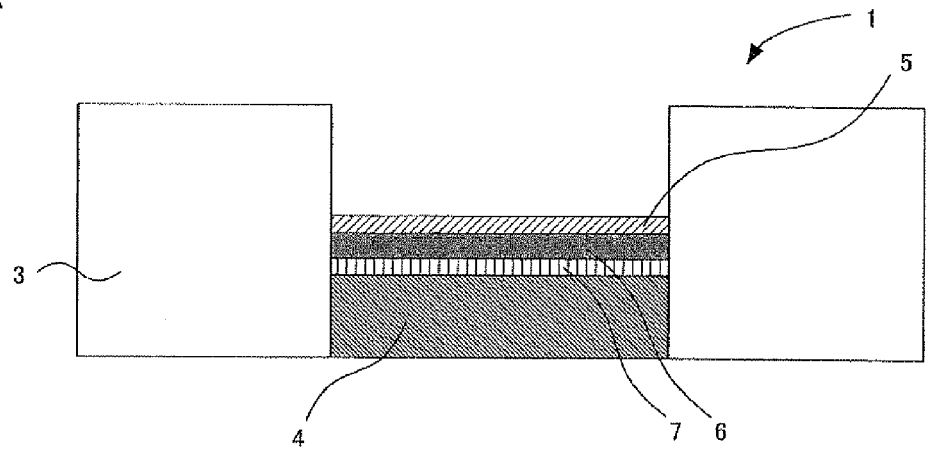
FIGS. 1A to 1C are each a schematic cross-sectional view showing an example of a method for producing an electrode laminate according to the present invention.
Figure 1B:
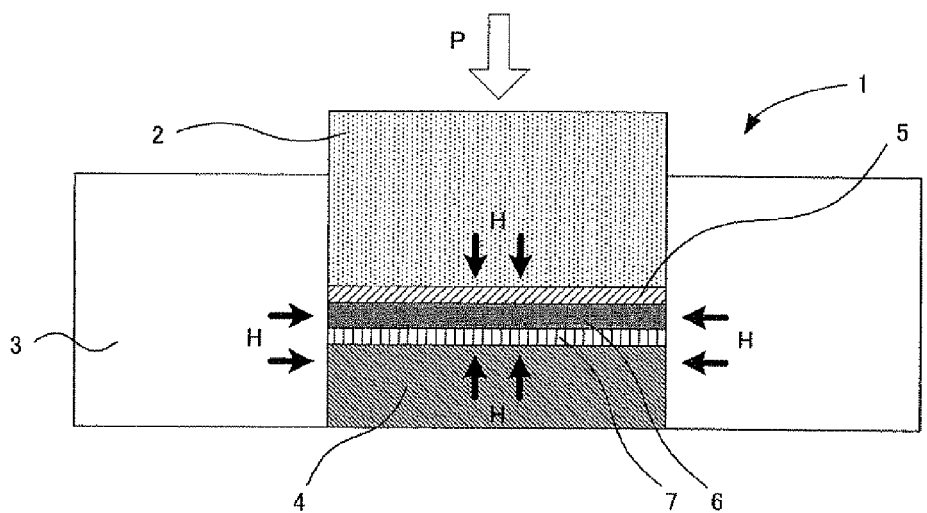
Figure 1C:
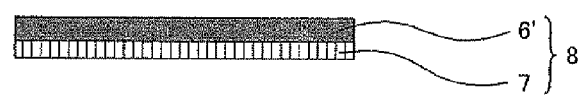

FIGS. 1A and 1C are each a schematic cross-sectional view showing an example of a method for producing an electrode laminate according to the present embodiment. As shown in FIG. 1A, a current collector 7 is disposed on a base 4 in an electrode laminate molding machine 1 which has a cylinder 3 and the base 9. An electrode layer forming composition 6 which contains at least a sulfide-based solid electrolyte and an active material and no binding agent is laminated on the current collector 7 (laminating step). A release substrate 5 is further disposed on the electrode layer forming composition 6. Next, as shown in FIG. 1B, a piston 2 is disposed on the release substrate 5. The current collector 7, the electrode layer forming composition 6, and the release substrate 5 are held between the piston 2 and the base 4 and subjected to application of pressure P. A heat quantity H is given to the electrode laminate molding machine 1 so that the temperature of the cylinder 3 is a predetermined temperature, and heating is performed for a predetermined period of time (heating step). After naturally cooled, as shown in FIG. 1C, an electrode laminate 8 having an electrode layer 6' and the current collector 7 is obtained.

Hereinafter, the method for producing an electrode laminate according to the first embodiment will be described for each step.

(1) Laminating Step

First, the laminating step in the present embodiment will be described. The laminating step in the present embodiment is a step of laminating an electrode layer forming composition, which contains at least a sulfide-based solid electrolyte and an active material and no binding agent on a current collector which uses aluminum as the material.

(a) Current Collector

The current collector used in the present embodiment uses aluminum as the material. Here, "aluminum" means a single aluminum or an alloy containing aluminum.

The current collector may have a shape such as a foil-shape, a plate-shape, and a mesh-shape. A metal vapor-deposited film in which the above-mentioned aluminum-based material is deposited on a substrate may be used. As the substrate used for the metal vapor-deposited film, there are organic and inorganic compounds; however, the inorganic compound is preferably used in view of heat resistance. Specifically, a glass plate, a silicon plate, and the like are used.

In the present embodiment, preferred is a foil-shaped current collector, because the contact area is large, and, at the same time, the entire film thickness of a secondary battery to be obtained can be reduced.

The thickness of the current collector is preferably within a range of 10 μm to 500 μm, more preferably 10 μm to 100 μm, and particularly preferably 10 μm to 50 μm, for example.

(b) Electrode Layer Forming Composition

The electrode layer forming composition used in the present embodiment is not limited especially as long as it contains at least a sulfide-based solid electrolyte and an active material and no binding agent. However, for example, the electrode layer forming composition preferably contains only a conductive auxiliary agent and a solvent in addition to the sulfide-based solid electrolyte and the active material.

i) Sulfide-Based Solid Electrolyte

The sulfide-based solid electrolyte used in the present embodiment is not limited especially as long as it contains sulfur (S) and has a lithium ion conductivity, and a sulfide-based solid electrolyte using a raw material composition containing, for example, $Li_2S$ and sulfides of elements of the $13^{th}$ to $15^{th}$ groups may be used. As a method of synthesizing a sulfide solid electrolyte with the use of the raw material composition, there is an amorphizing method, for example. As the amorphizing method, there are a mechanical milling method and a melt quenching method, for example. Particularly preferred is the mechanical milling method, because processing at normal temperature can be realized, and the manufacturing step can be simplified.

As examples of the elements of the $13^{th}$ to $15^{th}$ groups, there are Al, Si, Ge, P, As, and Sb. Specific examples of sulfides of the elements of the $13^{th}$ to $15^{th}$ groups may include $Al_2S_3$, $SiS_2$, $GeS_2$, $P_2S_3$, $P_2S_5$, $As_2S_3$, and $Sb_2S_3$. In the present embodiment, the sulfide of the $14^{th}$ or $15^{th}$ group is particularly preferably used. Especially, in the present embodiment, the sulfide solid electrolyte using the raw material composition containing $Li_2S$ and the sulfides of the elements of the $13^{th}$ to $15^{th}$ groups is preferably a $Li_2S$—$P_2S_5$ compound, a $Li_2S$—$SiS_2$ compound, a $Li_2S$—$GeS_2$ compound, or a $Li_2S$—$Al_2S_3$ compound. Particularly preferably is the $Li_2S$—$P_2S_5$ compound, because it has a superior lithium ion conductivity, and a high-power battery can be obtained. The mole fraction of $Li_2S$ in the $Li_2S$—$P_2S_5$ compound is preferably within a range of 50% to 95% and particularly preferably 60% to 80%, for example. Especially, in the present embodiment, it is preferable that $Li_2S$ and $P_2S_5$ satisfy a relation of $Li_2S:P_2S_5$=75:25 in terms of molar ratio, because a sulfide-based solid electrolyte which is more excellent in the lithium ion conductivity can be obtained. The $Li_2S$—$P_2S_5$ compound means a sulfide-based solid electrolyte using $Li_2S$ and $P_2S_5$. This also applies to other compounds.

The sulfide-based solid electrolyte used in the present embodiment may be noncrystalline or crystalline. A crystalline sulfide-based solid electrolyte can be obtained by firing a noncrystalline sulfide-based solid electrolyte, for example.

The sulfide-based solid electrolyte used in the present embodiment may be in the form of particle and particularly preferably an exactly spherical shape or an elliptic spherical shape, for example.

When the sulfide-based solid electrolyte is in the form of particle, the average particle diameter is preferably within a range of 1 nm to 100 μm and particularly preferably 0.1 μm to 50 μm, for example. As the average particle diameter, there can be used a value calculated by a laser diffraction type particle size distribution analyzer or a value obtained by measurement based on image analysis using an electron microscope such as SEM.

The sulfide-based solid electrolyte is contained in the electrode layer forming composition in preferably an amount of 1% by mass to 90% by mass, more preferably 10% by mass to 80% by mass, and particularly preferably 20% by mass to 60% by mass, for example.

ii) Active Material

The active material used in the present embodiment is not limited especially as long as it is generally used as an electrode active material of a lithium secondary battery.

Specifically, when the active material is a cathode active material, an oxide cathode active material may be used, for example. By virtue of the use of the oxide cathode active material, an all-solid battery having a high energy density can be provided.

As the oxide cathode active material used in the present embodiment, there is a cathode active material represented by a general formula: $Li_xM_yO_z$ (M is a transition metal element, x=0.02 to 2.2, y=1 to 2, and z=1.4 to 4), for example. In the general formula, it is preferable that M is at least one selected from a group consisting of Co, Mn, Ni, V, Fe, and Si, and more preferably at least one selected from a group consisting of Co, Ni, and Mn.

Specific examples of the above oxide cathode active material may include $LiCoO_2$, $LiMnO_2$, $LiNiO_2$, $LiVO_2$, $LiNi_{1/3}Co_{1/3}Mn_{1/3}O_2$, $LiMn_2O_4$, $Li(Ni_{0.5}Mn_{1.5})O_4$, $Li_2FeSiO_4$, and $Li_2MnSiO_4$.

As the oxide cathode active material other than the general formula: $Li_xM_yO_z$, there is an olivine type cathode active material such as $LiFePO_4$ and $LiMnPO_4$.

Particularly, the cathode active material used in the present embodiment is preferably $LiCoO_2$ or $LiNiO_2$. Particularly preferably is $LiCoO_2$, because it has favorable properties as an active material for cathode and is used widely.

The shape of the cathode active material is not limited especially as long as it can be mixed with the sulfide-based solid electrolyte. The cathode active material may be, for example, in the form of particle, and particularly preferably an exactly spherical shape or an elliptic spherical shape. When the cathode active material is in the form of particle, the average particle diameter is preferably within a range of 0.1 μm to 50 μm. As the average particle diameter, there can be used a value calculated by a laser diffraction type particle size distribution analyzer or a value obtained by measurement based on image analysis using an electron microscope such as SEM.

The cathode active material is contained in the cathode active material layer preferably in an amount of 10% by mass to 99% by mass, and particularly preferably 20% by mass to 90% by mass, for example.

When the active material is an anode active material, a metallic active material and a carbon active material may be used, for example. Examples of the metallic active material may include In, Al, Si, and Sn. Meanwhile, examples of the carbon active material may include mesocarbon microbead (MCMB), highly oriented graphite (HOPG), hard carbon, and soft carbon. Particularly, the carbon active material is preferably used as the anode active material used in the present embodiment.

The shape of the anode active material is not limited especially as long as it can be mixed with the sulfide-based solid electrolyte. The anode active material may be, for example, in the form of particle, and particularly preferably an exactly spherical shape or an elliptic spherical shape. When the anode active material is in the form of particle, the average particle diameter is preferably within a range of 0.1 μm to 50 μm. As the average particle diameter, there can be used a value calculated by a laser diffraction type particle size distribution analyzer or a value obtained by measurement based on image analysis using an electron microscope such as SEM.

The anode active material is contained in the anode active material layer preferably in an amount of 10% by mass to 99% by mass and particularly preferably 20% by mass to 90% by mass, for example.

iii) Other

The conductive auxiliary agent used in the present embodiment is not limited especially as long as it has a desired conductivity, and a conductive auxiliary agent composed of a carbon material may be used, for example. Specific examples of the conductive auxiliary agent may include acetylene black, ketjen black, and carbon fiber.

The content of the conductive auxiliary agent in the electrode layer forming composition used in the present embodiment is preferably as small as possible so long as desired electron conductivity can be secured. The conductive auxiliary agent is contained preferably in an amount of 0.1% by mass to 20% by mass and particularly preferably 0.1% by mass to 5% by mass, for example.

The solvent used in the present embodiment is not limited especially as long as it does not react with the sulfide-based solid electrolyte; however, the boiling point of the solvent is preferably not more than 200° C. to facilitate drying. A volatile solvent such as acetone, DMF, and NMP may be used, for example.

The content of the solvent in the electrode layer forming composition used in the present embodiment is not limited especially as long as a desired slurry solution can be prepared. The solvent is contained preferably in an amount of 20 to 80 parts by weight and particularly preferably 30 to 70 parts by weight based on 100 parts by weight of a solid content, for example.

(c) Release Substrate

In the present embodiment, the electrode layer forming composition should be laminated on the current collector; however, in this step, it is preferable that a release substrate is laminated on the electrode layer forming composition. This is because by virtue of the use of the release substrate, the electrode laminate of the present embodiment to be obtained after the heating step to be described later can be smoothly taken out from a well-known press machine or the like used in the heating step to be described later, for example. As the release substrate used in the present embodiment, a SUS foil may be used, for example. The release substrate may be laminated not only on the electrode layer forming composition but also under the current collector. The release substrate is removed from the electrode laminate of the present embodiment after the heating step to be described later.

(2) Heating Step

Next, the heating step in the present embodiment will be described. The heating step in the present embodiment is a step of heating the current collector and the electrode layer forming composition at a temperature of not less than 60° C. and adhering them.

The heating temperature in the heating step in the present embodiment is not limited especially as long as it is not less than 60° C.; however, it is preferably not less than 150° C. This is because the aluminum atoms derived from the current collector are easily diffused in the sulfide-based solid electrolyte in the electrode layer, and the electrode laminate having a high adhesiveness between the current collector and the electrode layer can be obtained.

The heating time in the heating step in the present embodiment is not more than 2 hours and particularly preferably not more than 0.5 hours, for example.

The atmosphere upon heating in the heating step in the present embodiment is not limited especially as long as it does not deteriorate the current collector and the electrode layer forming composition; however, the atmosphere is preferably an atmospheric atmosphere, an inert gas atmosphere such as a nitrogen atmosphere and an argon atmosphere, and a vacuum. Particularly preferred are the inert gas atmosphere and the vacuum, because less deterioration occurs. It is preferable that the atmosphere upon heating has a low humidity, because moisture contributes to deterioration.

As the heating method in the heating step in the present embodiment, there is a method using an electronic furnace, a heater, and induction heating, for example.

(3) Other Step

In the present embodiment, it is preferable to have a pressurizing step of pressure-molding the current collector and the electrode layer and integrating them in addition to the laminating step and the heating step, which are the essential steps, because the contact area between the current collector and the sulfide-based solid electrolyte is increased, and the electrode laminate having a higher adhesiveness between the current collector and the electrode layer can be obtained.

Although the pressurizing step may be performed before or after the heating step, it is normally preferable that the pressurizing step is performed before or simultaneously with the heating step, and particularly preferably that the both steps are simultaneously performed.

In the present embodiment, the pressure applied in the pressurizing step is preferably within a range of 0.5 ton/cm$^2$ to 5 ton/cm$^2$ and particularly preferably 1 ton/cm$^2$ to 4 ton/cm$^2$, for example.

The pressurizing time in the pressurizing step in the present embodiment is not more than 1 hour and particularly preferably not more than 0.5 hours, for example.

In the present embodiment, as a method of pressure-molding the current collector and the electrode layer in the pressurizing step, a well-known press machine such as hot roll press and hot flat press may be used, for example.

When the pressurizing step is performed before the heating step, in the present embodiment, the pressurizing step has a normal temperature-pressing step of pressing at normal temperature a metal foil of the current collector and the electrode layer forming composition which are previously at normal temperature. By virtue of the provision of the normal temperature-pressing step, unsoftened electrode layer forming composition can be sunk into the metal foil, whereby the contact area between the current collector and the sulfide-based solid electrolyte can be further increased.

(4) Electrode Laminate

The thickness of the electrode layer laminated in the electrode laminate of the present embodiment is preferably within a range of 0.1 μm to 1000 μm, more preferably 10 μm to 200 μm, and particularly preferably 10 μm to 100 μm for example.

2. Second Embodiment

Next, the method for producing an electrode laminate of the second embodiment of the present invention will be described. The method for producing an electrode laminate of the second embodiment comprises the steps of: laminating an electrode layer forming composition, which contains at least a sulfide-based solid electrolyte and an active material and no binding agent and no solvent, on a current collector; and heating the current collector and the electrode layer forming composition.

According to the present embodiment, by virtue of not containing the solvent, composition distribution of the electrode layer forming composition does not occur at an interface between the current collector and the electrode layer, and the sulfide-based solid electrolyte is not unevenly distributed. Therefore, the adhesiveness between the current collector and the electrode layer can be increased. Further, the current collector and the electrode layer forming composition are heated, whereby the electrode laminate having a high adhesiveness between the current collector and the electrode layer can be simply and easily obtained. Furthermore, by virtue of not containing the biding agent, the reduction in the capacity density of the battery and the increase of the internal resistance can be suppressed.

When the electrode layer forming composition contains the solvent, the composition distribution of the electrode layer forming composition occurs. This is because since the active material containing a metal element is normally heavier than the sulfide-based solid electrolyte, the active material in the electrode layer forming composition is settled out on the current collector side. When the composition distribution occurs, the adhesiveness between the current collector and the electrode layer is reduced; however, the reason for this is that the sulfide-based solid electrolyte in the electrode layer forming composition is unevenly distributed on the solid electrolyte layer side, and metal atoms derived from the current collector are hardly diffused in the sulfide-based solid electrolyte in the electrode layer.

Hereinafter, the method for producing an electrode laminate according to the second embodiment will be described for each step.

(1) Laminating Step

First, the laminating step in the present embodiment will be described. The laminating step in the present embodiment is a step of laminating an electrode layer forming composition, which contains at least a sulfide-based solid electrolyte and an active material and no binding agent and no solvent on a current collector.

(a) Current Collector

The current collector used in the present embodiment uses a metal as a material, because it has a high conductivity and is easily diffused in the sulfide-based solid electrolyte in the electrode layer.

Examples of the metal material may include stainless steel, copper, nickel, vanadium, gold, platinum, aluminum, magnesium, iron, titanium, cobalt, zinc, germanium, indium, and lithium. In the present embodiment, preferred are copper, nickel, and aluminum, and particularly preferred is aluminum. This is because aluminum atoms are diffused in the sulfide-based solid electrolyte in the electrode layer, whereby the sulfide-based solid electrolyte is stabilized, and the adhesiveness between the current collector and the electrode layer is increased.

Since the shape and thickness of the current collector in the present embodiment are similar to those in the first embodiment, the description will be omitted.

(b) Electrode Layer Forming Composition

The electrode layer forming composition used in the present embodiment is not limited especially as long as it contains at least a sulfide-based solid electrolyte and an active material and no binding agent and no solvent. However, for example, in addition to the sulfide-based solid electrolyte and the active material, the electrode layer forming composition preferably contains only a conductive auxiliary agent. Since the sulfide-based solid electrolyte, the active material, and the conductive auxiliary agent used in the present embodiment are similar to those in the first embodiment, the description will be omitted.

(c) Release Substrate

Also in the present embodiment, as in the first embodiment, the electrode layer forming composition should be laminated on the current collector, and, also in this step, it is preferable that a release substrate is laminated on the electrode layer forming composition. Since the release substrate used in the present embodiment is similar to those in the first embodiment, the description will be omitted.

(2) Heating Step

Next, the heating step in the present embodiment will be described. The heating step of the present embodiment is a step of hating the current collector and the electrode layer forming composition.

The heating temperature in the heating step in the present embodiment is not less than 120° C. and particularly preferably not less than 150° C., for example. This is because metal atoms derived from the current collector are more easily diffused in the sulfide-based solid electrolyte in the electrode layer, and the electrode laminate having a high adhesiveness between the current collector and the electrode layer can be obtained.

Since the heating time, the atmosphere upon heating, and the heating method in the heating step in the present embodiment are similar to those in the first embodiment, the description will be omitted.

(3) Other Step

Also in the present embodiment, as in the first embodiment, it is preferable to have a pressurizing step of pressure-molding the current collector and the electrode layer and integrating them, in addition to the laminating step and the heating step, which are the essential steps. When the pressurizing step is performed before the heating step, also in the present embodiment, the pressurizing step has a normal temperature-pressing step of pressing at normal temperature a metal foil of the current collector and the electrode layer forming composition which are previously at normal temperature. Since the details of the pressurizing step in the present embodiment are similar to those in the first embodiment, the description will be omitted.

(4) Electrode Laminate

Since the thickness of the electrode layer laminated in the electrode laminate of the present embodiment is similar to that in the first embodiment, the description will be omitted.

B. Electrode Laminate

Next, the electrode laminate of the present invention will be described. The electrode laminate of the present invention comprises: a current collector using aluminum as the material, and an electrode layer, in which an electrode layer forming composition containing at least a sulfide-based solid electrolyte and an active material and no binding agent is laminated on the current collector, wherein aluminum atoms derived from the current collector are diffused in a sulfide-based solid electrolyte in the electrode layer.

According to the present invention, the aluminum atoms derived from the current collector are diffused in the sulfide-based solid electrolyte in the electrode layer, whereby the electrode laminate having a high adhesiveness between the current collector and the electrode layer can be provided.

Hereinafter, the electrode laminate of the present invention will be described for each constitution.

1. Current Collector

First, the current collector in the present invention will be described. The current collector in the present invention uses aluminum as the material. Since the shape, thickness, and other factors of the current collector are similar to those described in "A. Method for producing electrode laminate, 1. First embodiment", the description will be omitted.

2. Electrode Layer

Next, the electrode layer in the present invention will be described. In the electrode layer in the present invention, the electrode layer forming composition, containing at least a sulfide-based solid electrolyte and an active material and no binding agent, is laminated on the current collector.

The electrode layer forming composition used in the present invention contains at least the sulfide-based solid electrolyte and the active material and no binding agent. According to need, the electrode layer forming composition may contain a conductive auxiliary agent in addition to the sulfide-based solid electrolyte and the active material. Since the sulfide-based solid electrolyte, the active material, and the conductive auxiliary agent used in the present invention are similar to those described in "A. Method for producing electrode laminate", the description will be omitted.

Since the thickness of the electrode layer in the present invention is similar to that described in "A. Method for producing electrode laminate", the description will be omitted.

3. Electrode Laminate

In the electrode laminate of the present invention, the aluminum atoms derived from the current collector are diffused in the sulfide-based solid electrolyte in the electrode layer. In the present invention, the concentration of the aluminum atoms derived from the current collector is preferably not less than 5 atom % and more preferably not less than 10 atom %, in a region from an adhesion interface between the current collector and the electrode layer to at least 250 nm in the depth direction in the electrode layer.

That is because if the concentration of the aluminum atoms derived from the current collector and diffused in the sulfide-based solid electrolyte in the electrode layer is too low, the adhesiveness between the current collector and the electrode layer may not be sufficient. The aluminum atom concentration can be examined by a transmission electron microscope-energy dispersive X-ray analyzer (TEM-EDX), for example.

The electrode laminate of the present invention can be used as an electrode of an all-solid lithium secondary battery, for example.

C. Method of Manufacturing all-Solid Secondary Battery

Next, a method of manufacturing an all-solid secondary battery according to the present invention will be described. The method of manufacturing an all-solid secondary battery in the present invention is characterized by having a battery element-forming step of forming a battery element with the use of the electrode laminate obtained by "A. Method for producing an electrode laminate" and a solid electrolyte layer.

According to the present invention, by virtue of the use of the electrode laminate obtained by the above-mentioned method for producing an electrode laminate, the adhesiveness between the current collector and the electrode layer can be increased, and the all-solid secondary battery which is highly durable in use can be obtained.

The method of manufacturing an all-solid secondary battery according to the present invention has a battery element-forming step, which for example has the following steps of: forming a cathode and an anode with the use of the electrode laminate obtained by "A. Method for producing an electrode laminate"; and forming the solid electrolyte layer between a cathode layer of the cathode and an anode layer of the anode to obtain a battery element composed of the cathode, the anode, and the solid electrolyte layer. The method may further have another step such as a battery assembling step of inserting the battery element into a battery case or the like to provide a battery.

In the present invention, the electrode laminate obtained by "A. Method for producing an electrode laminate" may be used in at least anyone of the cathode and the anode of the electrodes. Thus, when the cathode is formed by "A. Method for producing an electrode laminate", the anode may be formed by an anode layer forming step of forming an anode layer with the use of a generally-used anode material and an anode current collector forming step of forming an anode current collector on the anode layer.

When the anode is formed by "A. Method for producing an electrode laminate", the cathode may be formed by a cathode layer forming step of forming a cathode layer with the use of a generally-used cathode material and a cathode current collector forming step of forming a cathode current collector on the cathode layer.

Hereinafter, the method of manufacturing an all-solid secondary battery according to the present invention will be described for each step.

1. Battery Element-Forming Step

The battery element-forming step in the present invention will be described. In the battery element-forming step in the present invention, a battery element is formed using the electrode laminate obtained by the method described in "A. Method for producing an electrode laminate" and the solid electrolyte layer.

The solid electrolyte used in the solid electrolyte layer used in the present invention is not limited especially as long as it has a lithium ion conductivity and insulation properties; however, the solid electrolyte is particularly preferably a sulfide-based solid electrolyte, because the all-solid secondary battery excellent in output characteristics can be obtained. It is preferable that the solid electrolyte layer contains a large amount of the sulfide-based solid electrolyte, and it is particularly preferable that the solid electrolyte layer is composed of only the sulfide-based solid electrolyte, because the all-solid secondary battery more excellent in output characteristics can be obtained. Since the sulfide-based solid electrolyte used in the solid electrolyte layer is similar to that described in "A. Method for producing an electrode laminate", the description will be omitted.

The thickness of the solid electrolyte layer used in the present invention is preferably within a range of 0.1 μm to 1000 μm and particularly preferably 0.1 μm to 300 μm, for example.

In the present invention, a specific method of forming the battery element is not limited especially as long as the battery element can be formed using the electrode laminate obtained by "A. Method for producing an electrode laminate" in at least any one of the cathode and the anode and using a generally used solid electrolyte layer as the solid electrolyte layer. For example, there is a method of forming the cathode, which uses the electrode laminate obtained by the above-mentioned method for producing an electrode laminate, on one surface of the solid electrolyte layer and forming the anode, which uses the electrode laminate obtained by the above-mentioned method for producing an electrode laminate, on the other surface of the solid electrolyte layer, that is, on the opposite side of the cathode to form the battery element composed of the cathode, the solid electrolyte layer, and the anode.

2. Other Step

In the present invention, the method normally has a step such as the battery assembling step in addition to the battery element-forming step, which is the essential step of the present invention. As the battery case used in the battery assembling step, a metal battery case is generally used, and there is a stainless-steel battery case, for example.

According to need, the method may have the cathode layer forming step, the anode layer forming step, the cathode current collector forming step, and the anode current collector forming step explained above in addition to the battery element-forming step and the battery assembling step.

Since the above steps are similar to those in a general all-solid lithium secondary battery, the description will be omitted.

3. All-Solid Secondary Battery

Although the use of the all-solid secondary battery obtained by the present invention is not limited especially, it can be used as an all-solid lithium secondary battery for vehicle installation, for example.

Examples of the shape of the all-solid secondary battery obtained by the present invention may include a coin shape, a laminate shape, a cylindrical shape, and a square shape, more preferably the angular shape and the laminate shape, and particularly preferably the laminate shape.

D. All-Solid Secondary Battery

Next, the all-solid secondary battery of the present invention will be described. The all-solid secondary battery of the present invention is characterized by using any of the electrode laminates described in "B. Electrode laminate".

According to the present invention, by virtue of the use of the above-mentioned electrode laminate, the all-solid secondary battery which is highly durable in use can be provided. The all-solid secondary battery of the present invention has at least a cathode, an anode, and a solid electrolyte layer formed between the cathode and the anode.

Hereinafter, the all-solid secondary battery of the present invention will be described for each constitution.

1. Cathode

First, the cathode in the present invention will be described. Although the cathode in the present invention uses the above-mentioned electrode laminate, the electrode laminate of the present invention may be used in at least any one of the cathode and the anode of the all-solid secondary battery. Namely, when the electrode laminate of the present invention is used in the anode, a cathode layer obtained by mixing a generally-used cathode active material such as lithium cobalt oxide ($LiCoO_2$), and the sulfide-based solid electrolyte and a generally-used current collector using aluminum or stainless steel as the material, for example may be used as the cathode.

2. Anode

Next, the anode in the present invention will be described. Although the anode in the present invention uses the above-mentioned electrode laminate, the electrode laminate of the present invention may be used in at least any one of the cathode and the anode of the all-solid secondary battery. Namely, when the electrode laminate of the present invention is used in the cathode, an anode layer obtained by mixing a generally-used anode active material such as graphite and the sulfide-based solid electrolyte, and a generally-used current collector formed of copper or stainless steel, for example may be used as the anode.

3. Solid Electrolyte Layer

Since the solid electrolyte layer in the present invention is similar to that described in "C. Method of manufacturing all-solid secondary battery", the description will be omitted.

4. Other Constitution

The all-solid secondary battery in the present invention has at least the cathode, the anode, and the solid electrolyte layer explained above. The all-solid secondary battery normally has a battery case through which a battery element composed of the cathode, the anode, and the solid electrolyte layer is inserted. As the battery case used in the present invention, a battery case for a general all-solid secondary battery can be used. The battery case may be formed of SUS or aluminum, for example.

5. All-Solid Secondary Battery

The method of manufacturing an all-solid secondary battery according to the present invention is not limited especially as long as the above-mentioned all-solid secondary battery can be obtained, and the method described in "C. Method of manufacturing all-solid secondary battery" may be used, for example.

Since the use and shape of the all-solid secondary battery in the present invention are similar to those described in "C. Method of manufacturing all-solid secondary battery", the description will be omitted.

The present invention is not limited to the above embodiments. The above embodiments are examples and have substantially the same constitution as the technical idea described in claims of the present invention. Any embodiments providing similar operational effects are contained in the technical scope of the present invention.

EXAMPLES

Hereinafter, examples are shown, and the present invention will be described more specifically.

Example 1

First, an aluminum foil with a thickness of 0.015 mm was hollowed out to obtain a single aluminum foil having a shape of a circle of $\phi 11.28$ mm to provide a current collector. Likewise, a SUS foil with a thickness of 0.015 mm was hollowed out to obtain a SUS foil having a shape of a circle of $\phi 11.28$ mm to provide a release substrate.

Next, the current collector was disposed in a press molding machine, and a cathode layer forming composition, in which a sulfide-based solid electrolyte ($Li_2S$—$P_2S_5$ compound) and a cathode active material ($LiCoO_2$) were mixed in a mass ratio of $Li_2S$—$P_2S_5$ compound:$LiCoO_2$=3:7, was laminated on the current collector, and the release substrate was further disposed on the cathode layer forming composition. The obtained laminate was held by the press molding machine to be subjected to application of a pressure of 2 ton/cm$^2$ from above and below.

Next, the press molding machine was heated in an electric furnace so that the press temperature was 150° C., and the temperature was maintained for 30 minutes. After naturally cooled, an electrode laminate composed of an aluminum foil/cathode layer was obtained.

Examples 2 to 5

Electrode laminates were obtained in a similar manner to the example 1 except that the press temperatures were respectively 210° C., 100° C., 60° C., and 45° C. The obtained electrode laminates were respectively an example 2, an example 3, an example 4, and an example 5 in this order.

Comparative Example 1

An electrode laminate was obtained in a similar manner to the example 1 except that the press temperature was 25° C. without heating.

Example 6

An electrode laminate composed of a copper foil/anode layer was obtained in a similar manner to the example 1 except the followings: that a copper foil with a thickness of 0.012 mm was used in the current collector, an anode layer forming composition, in which a sulfide-based solid electrolyte ($Li_2S$—$P_2S_5$ compound) and an anode active material (carbon graphite) were mixed in a mass ratio of $Li_2S$—$P_2S_5$ compound:carbon graphite=1:1, was used in the electrode layer forming composition, and the press temperature was 210° C.

Comparative Example 2

An electrode laminate was obtained in a similar manner to the example 6 except that the press temperature was 25° C. without heating.

[Evaluation 1]

(Peeling Strength Measurement)

Figure 2:
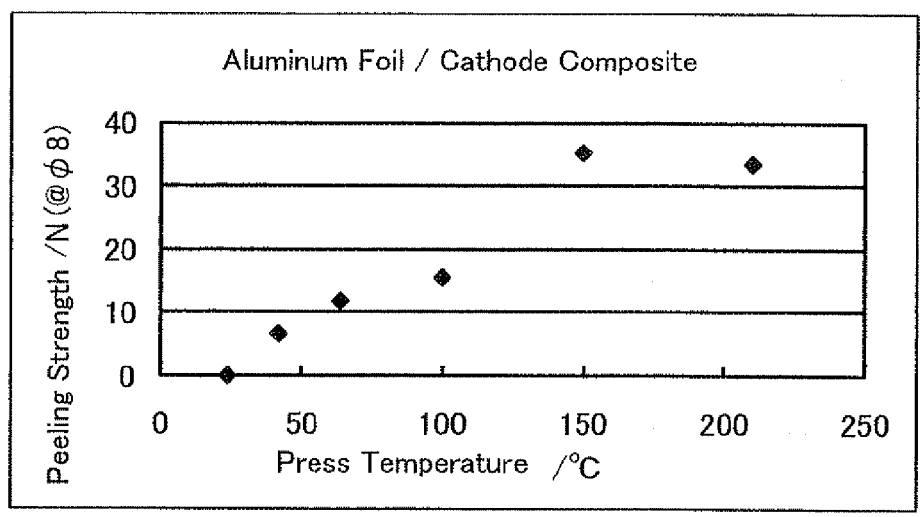
FIG. 2 is a graph showing a measurement result of a peeling strength between an aluminum foil and a cathode layer in each of the electrode laminates obtained in examples 1 to 6 and a comparative example 1.
Figure 3:
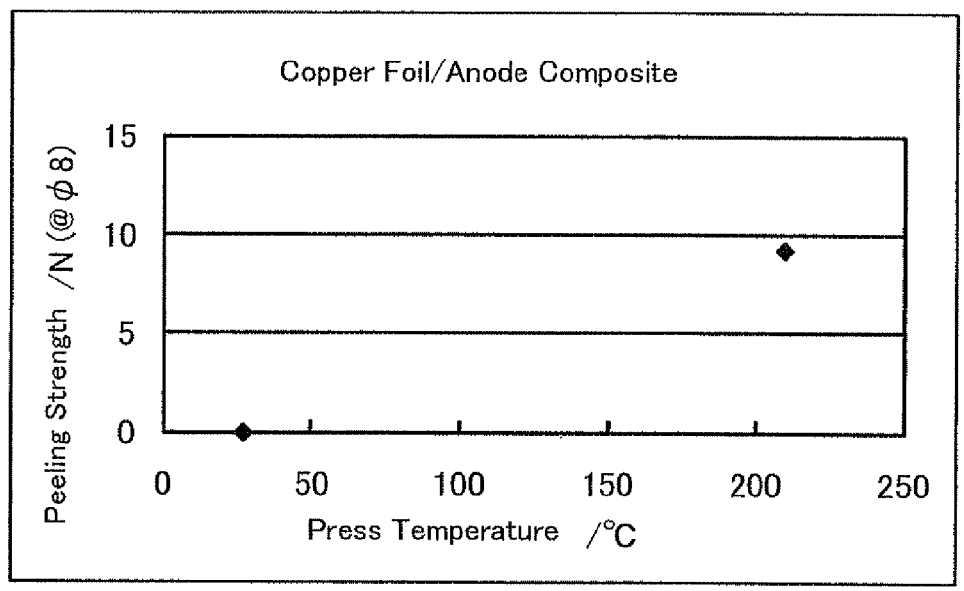
FIG. 3 is a graph showing a measurement result of a peeling strength between a copper foil and an anode layer in each of the electrode laminates obtained in an example 7 and a comparative example 2.

The peeling strength between the aluminum foil and the cathode layer was measured using the electrode laminates obtained in the examples 1 to 5 and the comparative example 1. Specifically, a double-sided adhesive tape of $\phi 8$ mm was applied onto the upper and lower surfaces of the electrode laminate composed of an aluminum foil/cathode layer. Then, the peeling strength between the aluminum foil and the cathode layer was measured by a tensile strength testing machine. The result is shown in FIG. 2. Likewise, the peeling strength between the copper foil and the anode layer was measured using the electrode laminates obtained in the example 6 and the comparative example 2. The Result is Shown in FIG. 3.

As shown in FIG. 2, the peeling strength between the aluminum foil and the cathode layer is increased by heating, and especially when the press temperature is not less than 150° C., it is confirmed that the peeling strength is significantly increased. Likewise, as shown in FIG. 3, when the press temperature is 210° C., it is confirmed that the peeling strength between the copper foil and the anode layer is increased.

Example 7

A solid electrolyte laminate was obtained in a similar manner to the example 1 except that only a sulfide-based solid electrolyte was used instead of the electrode layer forming composition, and the press temperature was 210° C.
[Evaluation 2]
(Qualitative Analysis of Interface by TEM/EDX)

A qualitative analysis of an interface between the aluminum foil and the solid electrolyte was performed by a transmission electron microscope-energy dispersive X-ray analyzer (TEM-EDX), using the solid electrolyte laminate obtained in the example 7. The results of a TEM image and EDX line analysis are shown in FIG. 4.

Figure 4:
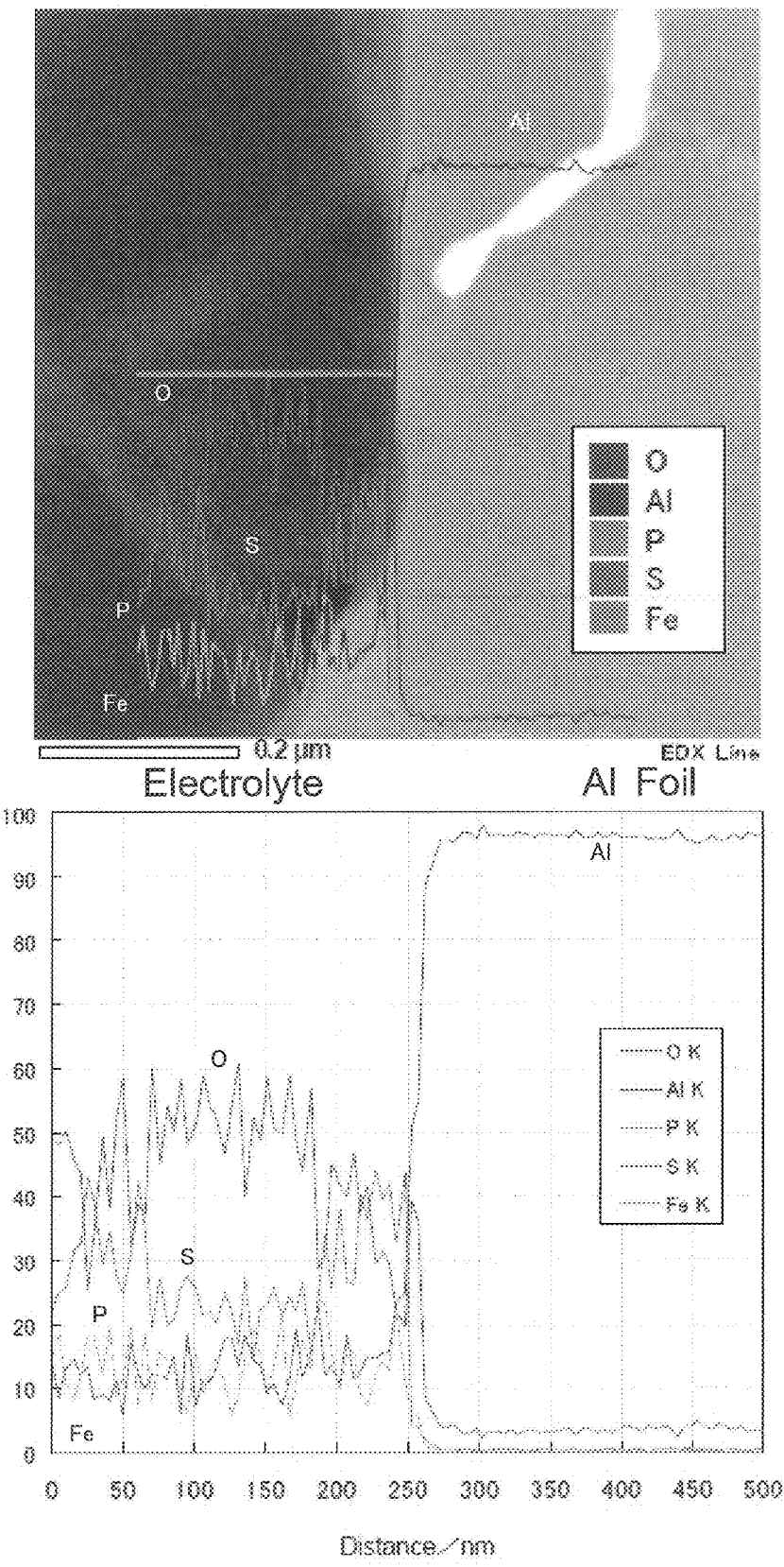
FIG. 4 is a graph showing TEM image and EDX line analysis results at an interface between an aluminum foil and a solid electrolyte in a solid electrolyte laminate obtained in an example 8.

As shown in FIG. 4, the existence of the aluminum atoms was confirmed in the solid electrolyte from an adhesion interface between the aluminum foil and the solid electrolyte to a depth of 250 nm. The concentration of the aluminum atoms was 10 atom %, and this value was comparable to that of phosphorus (P) contained in the sulfide-based solid electrolyte. According to this constitution, it is confirmed that the aluminum atoms derived from the aluminum foil as the current collector are diffused in the sulfide-based solid electrolyte.

Example 8

Heptane was added to the cathode layer forming composition, in which a sulfide-based solid electrolyte ($Li_2S$—$P_2S_5$ compound) and a cathode active material ($LiCoO_2$) were mixed in a mass ratio of $Li_2S$—$P_2S_5$ compound:$LiCoO_2$=3:7, so that the solid fraction was 50%, and they were mixed using a shaking machine to prepare a slurry of the cathode layer forming composition.

Next, the slurry was coated onto the aluminum foil using a doctor blade to film-form a sheet-like cathode layer forming composition with a thickness of 85 μm. The cathode layer forming composition was dried on a hot plate of 120° C. for 2 hours under an argon atmosphere. The aluminum foil/cathode layer forming composition laminating sheet was held from above and below by a SOS foil with a thickness of 50 μm and passed through a hot roll press in which a roll temperature was set to 210° C., and a clearance between rolls was set to 100 μm, whereby the electrode laminate composed of the aluminum foil/cathode layer was obtained.

Figure 5A:
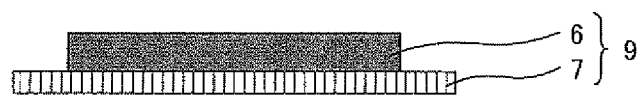
FIGS. 5A to 5D are each a schematic cross-sectional view showing an example of a method of fixing a current collector and an electrode layer forming composition using a hot roll press.
Figure 5B:
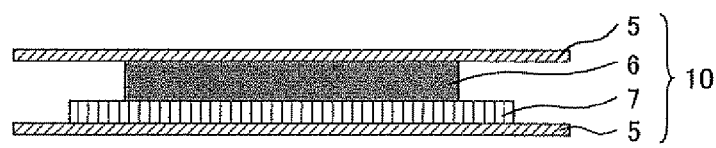
Figure 5C:
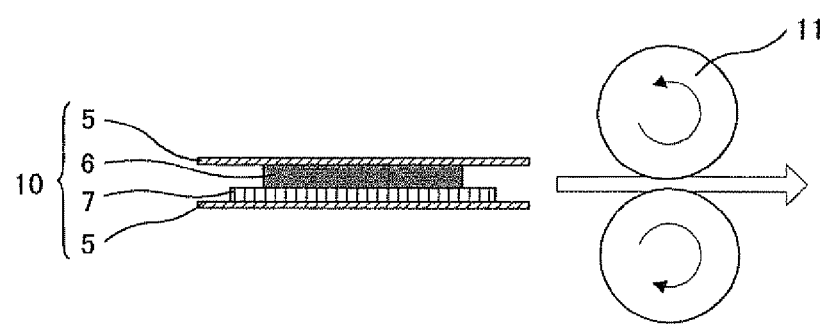
Figure 5D:

FIGS. 5A to 5D each shows a schematic cross-sectional view of an example of a fixing method using a hot roll press. As shown in FIG. 5A, the electrode layer forming composition 6 is film-formed on the current collector 7 to form a current collector/electrode layer forming composition laminating sheet 9. Next, as shown in FIG. 5B, the current collector/electrode layer forming composition laminating sheet 9 is held from above and below by the release substrate 5 to form a holding body 10. Then, as shown in FIG. 5C, the holding body 10 is passed through a hot roll press machine 11, whereby, as shown in FIG. 5D, the release substrate 5 is removed, and the electrode laminate 8 in which the electrode layer 6' and the current collector 7 are bonded is obtained.

Example 9

An electrode laminate was obtained in a similar manner to the example 8 except that electrostatic screen printing was used as a method of coating the cathode layer forming composition onto the aluminum foil, and heating and pressurizing were performed without the drying step.

Example 10

An electrode laminate was obtained in a similar manner to the example 8 except that an aluminum foil/cathode layer forming composition sheet was previously heated by infrared rays and was thereafter pressurized.

Example 11

An electrode laminate was obtained in a similar manner to the example 9 except that an aluminum foil/cathode layer forming composition sheet was previously heated by infrared rays and was thereafter pressurized.
[Evaluation 3]
(Peeling Strength Measurement)

The peeling strength between the aluminum foil and the cathode layer was measured in a similar manner to [Evaluation 1] except that the electrode laminate obtained in the example 8 was used, and a sample of 1 cm square was cut out from the electrode laminate. The result is shown in table 1.

TABLE 1

| | Electrode layer/substrate | Temperature | Peeling strength |
|---|---|---|---|
| Example 8 | Cathode/Al | 210° C. | 31 N (φ8 mm) |

As shown in table 1, in the example 8, a high peeling strength was obtained. Also in the examples 9 to 11, the similar results were obtained. According to this constitution, the cathode layer forming composition was coated to the current collector with the use of a slurry or electrostatic screen printing, and the aluminum foil of the current collector and the cathode layer forming composition were heated and pressurized, whereby it was confirmed that the cathode layer can be bonded on the aluminum foil.

EXPLANATION OF REFERENCES

| | |
|---|---|
| 1 | Electrode laminate molding machine |
| 2 | Piston |
| 3 | Cylinder |
| 4 | Base |
| 5 | Release substrate |
| 6 | Electrode layer forming composition |
| 6' | Electrode layer |

-continued

| | |
|---|---|
| 7 | Current collector |
| 8 | Electrode laminate |
| 9 | Current collector/electrode layer forming composition laminating sheet |
| 10 | Holding body |
| 11 | Hot roll press machine |

The invention claimed is:

1. A method for producing an electrode laminate, the electrode laminate comprising:
   a current collector comprising aluminum as a material and an electrode layer laminated on the current collector, the method comprising:
   laminating an electrode layer forming composition, which contains at least a sulfide-based solid electrolyte and an active material and no binding agent, on the current collector; and
   heating the current collector and the electrode layer forming composition in the range of 60° C. to 210° C. and adhering them.

2. The method for producing an electrode laminate according to claim 1, wherein the electrode layer forming composition contains only the sulfide-based solid electrolyte, the active material, a conductive auxiliary agent, and a solvent.

3. A method for producing an electrode laminate, the electrode laminate comprising:
   a current collector comprising a metal as a material and an electrode layer laminated on the current collector, the method comprising:
   laminating an electrode layer forming composition, which contains at least a sulfide-based solid electrolyte and an active material and no binding agent and no solvent, on the current collector; and
   heating the current collector and the electrode layer forming composition in the range of 120° C. to 210° C. and adhering them.

4. The method for producing an electrode laminate according to claim 3, wherein the electrode layer forming composition contains only the sulfide-based solid electrolyte, the active material, and a conductive auxiliary agent.

5. The method for producing an electrode laminate according to claim 1, wherein a heating temperature in the heating is not less than 150° C.

6. The method for producing an electrode laminate according to claim 3, wherein a heating temperature in the heating is not less than 150° C.

7. The method for producing an electrode laminate according to claim 1, further comprising pressure-molding the current collector and the electrode layer and integrating them.

8. The method for producing an electrode laminate according to claim 3, further comprising pressure-molding the current collector and the electrode layer and integrating them.

9. The method for producing an electrode laminate according to claim 7, wherein the pressure-molding comprises, before the heating, a pressing at normal temperature a metal foil of the current collector and the electrode layer forming composition which are previously at normal temperature.

10. The method for producing an electrode laminate according to claim 8, wherein the pressure-molding comprises, before the heating, a pressing at normal temperature a metal foil of the current collector and the electrode layer forming composition which are previously at normal temperature.

11. The method for producing an electrode laminate according to claim 1, wherein the sulfide-based solid electrolyte is a $Li_2S$—$P_2S_5$ compound.

12. The method for producing an electrode laminate according to claim 3, wherein the sulfide-based solid electrolyte is a $Li_2S$—$P_2S_5$ compound.

13. The method for producing an electrode laminate according to claim 1, wherein the active material is lithium cobalt oxide ($LiCoO_2$).

14. The method for producing an electrode laminate according to claim 3, wherein the active material is lithium cobalt oxide ($LiCoO_2$).

15. An electrode laminate, comprising:
    a current collector comprising aluminum as a material and an electrode layer formed by laminating an electrode layer forming composition, which contains at least a sulfide-based solid electrolyte and an active material and no binding agent, on the current collector, wherein:
    aluminum atoms derived from the current collector are diffused in the sulfide-based solid electrolyte in the electrode layer.

16. The electrode laminate according to claim 15, wherein the sulfide-based solid electrolyte is a $Li_2S$—$P_2S_5$ compound.

17. The electrode laminate according to claim 15, wherein the active material is lithium cobalt oxide ($LiCoO_2$).

18. The electrode laminate according to claim 15, wherein a concentration of the aluminum atoms derived from the current collector is not less than 10 atom % in a region from an adhesion interface between the current collector and the electrode layer to at least 250 nm in the depth direction in the electrode layer.

19. A method for producing an all-solid secondary battery comprising forming a battery element comprising the electrode laminate obtained by the method for producing an electrode laminate according to claim 1 and a solid electrolyte layer.

20. A method for producing an all-solid secondary battery comprising forming a battery element comprising the electrode laminate obtained by the method for producing an electrode laminate according to claim 3 and a solid electrolyte layer.

21. An all-solid secondary battery comprising the electrode laminate according to claim 15.

* * * * *